United States Patent
Bialer et al.

(10) Patent No.: US 11,428,782 B2
(45) Date of Patent: Aug. 30, 2022

(54) NEURAL NETWORK-BASED OBJECT SURFACE ESTIMATION IN RADAR SYSTEM

(71) Applicant: GM Global Technology Operations LLC, Detroit, MI (US)

(72) Inventors: Oded Bialer, Petah Tivak (IL); Tom Tirer, Tel Aviv (IL); David Shapiro, Netanya (IL); Amnon Jonas, Jerusalem (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 590 days.

(21) Appl. No.: 16/401,419

(22) Filed: May 2, 2019

(65) Prior Publication Data

US 2020/0348396 A1    Nov. 5, 2020

(51) Int. Cl.
 *G01S 7/41*  (2006.01)
 *G01S 13/931* (2020.01)
 *G06N 3/08*  (2006.01)
 *G01S 13/72*  (2006.01)

(52) U.S. Cl.
 CPC .............. *G01S 7/417* (2013.01); *G01S 13/72* (2013.01); *G01S 13/931* (2013.01); *G06N 3/08* (2013.01)

(58) Field of Classification Search
 CPC ................................. G01S 13/72; G01S 7/417
 See application file for complete search history.

(56) References Cited

U.S. PATENT DOCUMENTS

| | | | | |
|---|---|---|---|---|
| 4,546,355 | A * | 10/1985 | Boles ...................... | G01S 13/66 342/25 C |
| 2010/0113921 | A1 * | 5/2010 | Fear ...................... | A61B 5/1077 600/443 |
| 2013/0176161 | A1 * | 7/2013 | Derham .................. | G01S 13/04 342/27 |
| 2018/0364360 | A1 * | 12/2018 | Zellinger .............. | G01S 17/894 |
| 2019/0147610 | A1 * | 5/2019 | Frossard .............. | G06N 3/0454 382/103 |
| 2020/0249314 | A1 * | 8/2020 | Eshet ...................... | G01S 13/42 |
| 2020/0326174 | A1 * | 10/2020 | Piatek ...................... | G06F 30/00 |
| 2021/0255304 | A1 * | 8/2021 | Fontijne ............... | G01S 13/867 |
| 2021/0286923 | A1 * | 9/2021 | Kristensen ............. | G06N 3/088 |

* cited by examiner

*Primary Examiner* — Vladimir Magloire
*Assistant Examiner* — Nazra Nur Waheed
(74) *Attorney, Agent, or Firm* — Cantor Colburn LLP

(57) ABSTRACT

Systems and methods to perform object surface estimation using a radar system involve receiving reflected signals resulting from reflection of transmit signals by an object. The method includes processing the reflected signals to obtain an image. The image indicates an intensity associated with at least one set of angle values and a set of range values. The method also includes processing the image to provide the object surface estimation. The object surface estimation indicates a subset of the at least one set of angle values and associated ranges within the set of range values.

11 Claims, 6 Drawing Sheets

NEURAL NETWORK-BASED OBJECT SURFACE ESTIMATION IN RADAR SYSTEM

INTRODUCTION

The subject disclosure relates to a neural network-based object surface estimation using a radar system.

Radar systems and other sensors are increasingly used in vehicles (e.g., automobiles, trucks, farm equipment, construction equipment, automated factories) to obtain information about the vehicle and its surroundings. A radar system may identify objects in the path of the vehicle, for example, and facilitate autonomous or semi-autonomous vehicle operation. Reflections may not be received from every area on the surface of a vehicle. Thus, determining the outline of the vehicle—for accurate identification, collision avoidance, and other purposes—may be challenging. In addition, reflections may be received from the interior of a vehicle or sidelobes may result in areas unrelated to the vehicle, further challenging an effort to estimate the surface outline of the vehicle. Accordingly, it is desirable to provide a neural network-based object surface estimation using a radar system.

SUMMARY

In one exemplary embodiment, a method to perform object surface estimation using a radar system includes receiving reflected signals resulting from reflection of transmit signals by an object, and processing the reflected signals to obtain an image. The image indicates an intensity associated with at least one set of angle values and a set of range values. The method also includes processing the image to provide the object surface estimation. The object surface estimation indicates a subset of the at least one set of angle values and associated ranges within the set of range values.

In addition to one or more of the features described herein, the receiving the reflected signals includes using a one-dimensional array of antenna elements, and the image is a two-dimensional image indicating the intensity associated with the set of angle values and the set of range values.

In addition to one or more of the features described herein, the using the one-dimensional array of antenna elements includes using a horizontal array of antenna elements, and providing the object surface estimation includes indicating azimuth angle values from which the reflected signals originate and the associated ranges or indicating the azimuth angle values and associated minimum and maximum ranges.

In addition to one or more of the features described herein, the receiving the reflected signals includes using a two-dimensional array of antenna elements, and the image is a three-dimensional image indicating the intensity associated with a first set of angle values, a second set of angle values, and the set of range values.

In addition to one or more of the features described herein, providing the object surface estimation includes indicating azimuth angle values from which the reflected signals originate for each elevation angle and the associated ranges.

In addition to one or more of the features described herein, providing the object surface estimation includes indicating azimuth angle values from which the reflected signals originate, associated minimum and maximum elevation angles, and associated minimum and maximum ranges.

In addition to one or more of the features described herein, the method also includes training a neural network to implement the processing of the image.

In addition to one or more of the features described herein, the training the neural network includes implementing a supervised learning process by calculating a loss based on an output of the neural network and on ground truth.

In addition to one or more of the features described herein, the training the neural network includes providing the loss as feedback to the neural network.

In addition to one or more of the features described herein, the method also includes locating the radar system in a vehicle and controlling an operation of the vehicle based on the object surface estimation.

In another exemplary embodiment, a system to perform object surface estimation using a radar system includes a plurality of antenna elements to receive reflected signals resulting from reflection of transmit signals by an object. The system also includes a processor to process the reflected signals to obtain an image. The image indicates an intensity associated with at least one set of angle values and a set of range values. The processor also processes the image to provide the object surface estimation. The object surface estimation indicates a subset of the at least one set of angle values and associated ranges within the set of range values.

In addition to one or more of the features described herein, the plurality of antenna elements is arranged as a one-dimensional array of antenna elements, and the image is a two-dimensional image indicating the intensity associated with the set of angle values and the set of range values.

In addition to one or more of the features described herein, the one-dimensional array of antenna elements is a horizontal array of antenna elements, and the object surface estimation includes an indication of azimuth angle values from which the reflected signals originate and the associated ranges or indicating the azimuth angle values and associated minimum and maximum ranges.

In addition to one or more of the features described herein, the plurality of antenna elements is arranged as a two-dimensional array of antenna elements, and the image is a three-dimensional image indicating the intensity associated with a first set of angle values, a second set of angle values, and the set of range values.

In addition to one or more of the features described herein, the object surface estimation includes an indication of azimuth angle values from which the reflected signals originate for each elevation angle and the associated ranges.

In addition to one or more of the features described herein, the object surface estimation includes an indication of azimuth angle values from which the reflected signals originate, associated minimum and maximum elevation angles, and associated minimum and maximum ranges.

In addition to one or more of the features described herein, the processor implements a neural network to process the image.

In addition to one or more of the features described herein, the neural network is trained by a supervised learning process that includes calculating a loss based on an output of the neural network and on ground truth.

In addition to one or more of the features described herein, the loss is provided as feedback to the neural network in the training.

In addition to one or more of the features described herein, the radar system is in or on a vehicle and an operation of the vehicle is controlled based on the object surface estimation.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
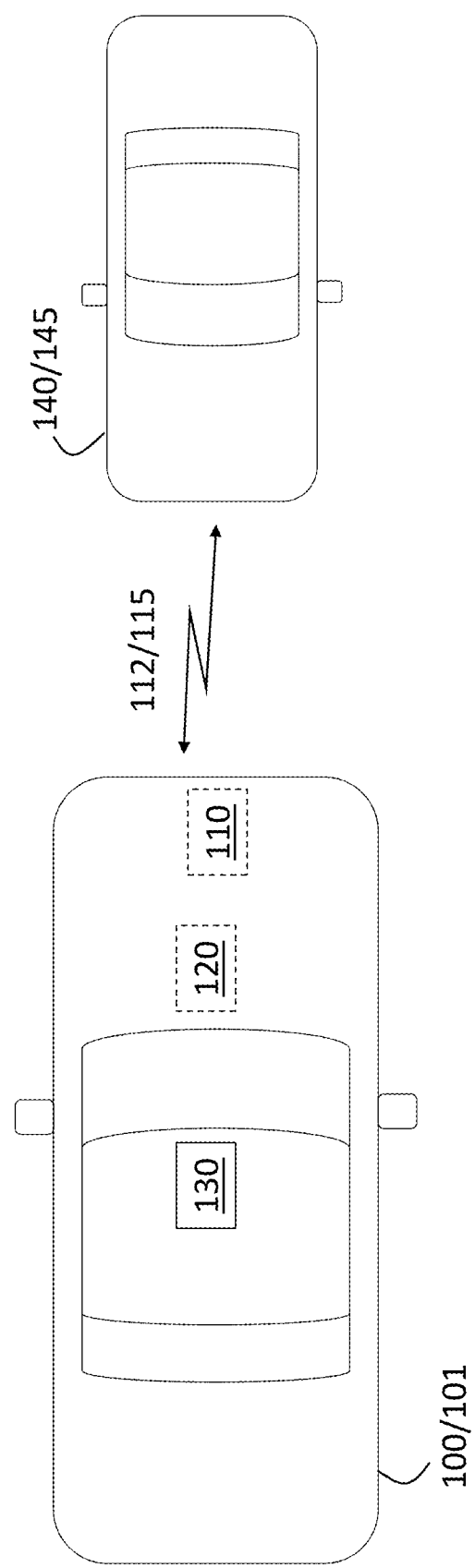
FIG. 1 is a block diagram of a vehicle that implements a neural network-based object surface estimation using a radar system according to one or more embodiments.

The following description is merely exemplary in nature and is not intended to limit the present disclosure, its application or uses. It should be understood that throughout the drawings, corresponding reference numerals indicate like or corresponding parts and features.

As previously noted, it may be desirable to determine the surface outline of an object using a radar system. Object surface estimation facilitates correctly identifying an object (e.g., pedestrian, lamp post, small vehicle, large vehicle). Correctly identifying the object facilitates correctly addressing the object with an autonomous or semi-autonomous vehicle system (e.g., collision avoidance, automated braking, adaptive cruise control, autonomous driving). As also previously noted, some of the challenges to object surface estimation include the fact that some areas of the surface may not provide reflections, while areas not on the surface (e.g., vehicle interior) may provide reflections, and sidelobes at ranges unrelated to the object may cause false detections. Embodiments of the systems and methods detailed herein relate to a neural network-based object surface estimation using a radar system. A supervised learning process is implemented to teach a neural network to output a classification (i.e., reflection or no reflection) and a range associated with one or more angle dimensions (e.g., azimuth, elevation).

In accordance with an exemplary embodiment, FIG. 1 is a block diagram of a vehicle 100 that implements a neural network-based object surface estimation using a radar system 110. The exemplary vehicle 100 shown in FIG. 1 is an automobile 101. The radar system 110 emits transmit signals 112 and receives reflected signals 115 based on reflection of the transmit signals 112 by one or more objects 140. The exemplary object 140 shown in FIG. 1 is a car 145. By obtaining a surface estimation for the exemplary object 140, it may correctly be identified as a car 145 and its range to the radar system 110 may be accurately determined. The vehicle 100 may include other sensors 130 (e.g., lidar system, camera) in addition to the radar system 110. A controller 120 may obtain data or processed information from the radar system 110 and other sensors 130. The controller 120 may control one or more operations of the vehicle 100 in an autonomous or semi-autonomous manner. The processing of data obtained by the radar system 110, including implementation of a neural network, may be done within the radar system 110, by the controller 120, or a combination of the two. The processing, whether in the radar system 110 or controller 120, may involve processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figures 2, 3:
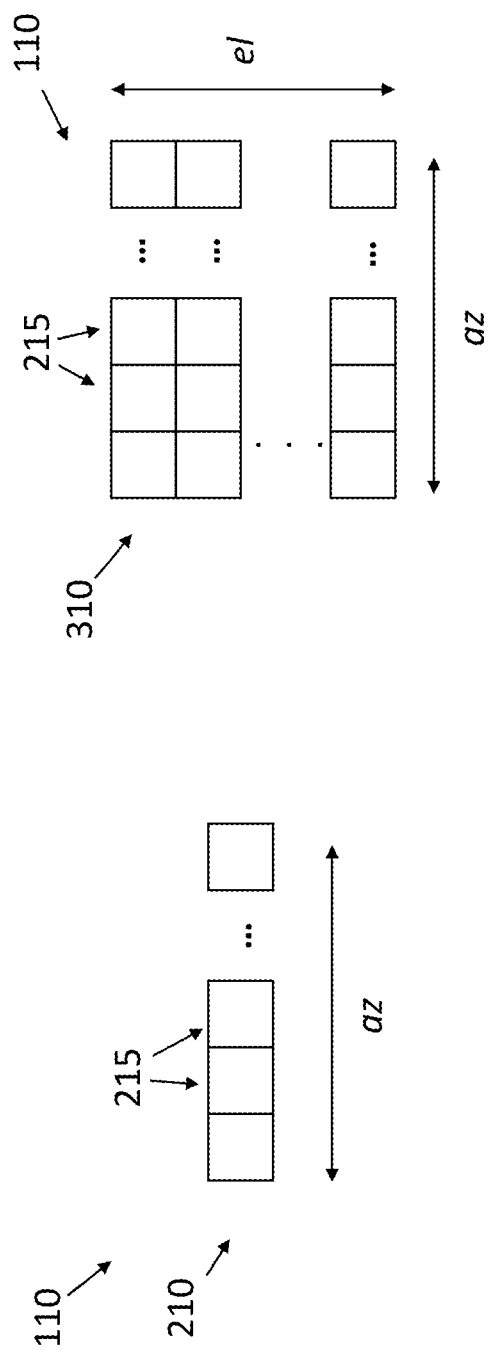
FIG. 2 shows an antenna array for a radar system used in implementing a neural network-based object surface estimation according to one or more embodiments.
FIG. 3 shows an antenna array for a radar system used in implementing a neural network-based object surface estimation according to one or more embodiments.

FIGS. 2 and 3 show aspects of a radar system 110 according to different embodiments. Continuing reference is made to components in FIG. 1. FIG. 2 shows an antenna array 210 for a radar system 110 used in implementing a neural network-based object surface estimation according to one or more embodiments. The antenna array 210 is a one-dimensional array of receive antenna elements 215 oriented horizontally. Thus, an azimuth az angle of arrival of the reflection points of an object 140 can ultimately be determined by processing the reflected signals 115 obtained with the antenna array 210. FIG. 3 shows an antenna array 310 for a radar system 110 used in implementing a neural network-based object surface estimation according to one or more embodiments. The antenna array 310 is a two-dimensional array of receive antenna elements 215 oriented horizontally and vertically. Thus, an azimuth az and an elevation el angle of arrival of the reflection points of an object 140 can ultimately be determined by processing the reflected signals 115 obtained with the antenna array 310. While the exemplary antenna arrays 210, 310 respectively have horizontal and horizontal and vertical orientations, the antenna arrays 210, 310 may be oriented differently in alternate embodiments.

Figure 4:
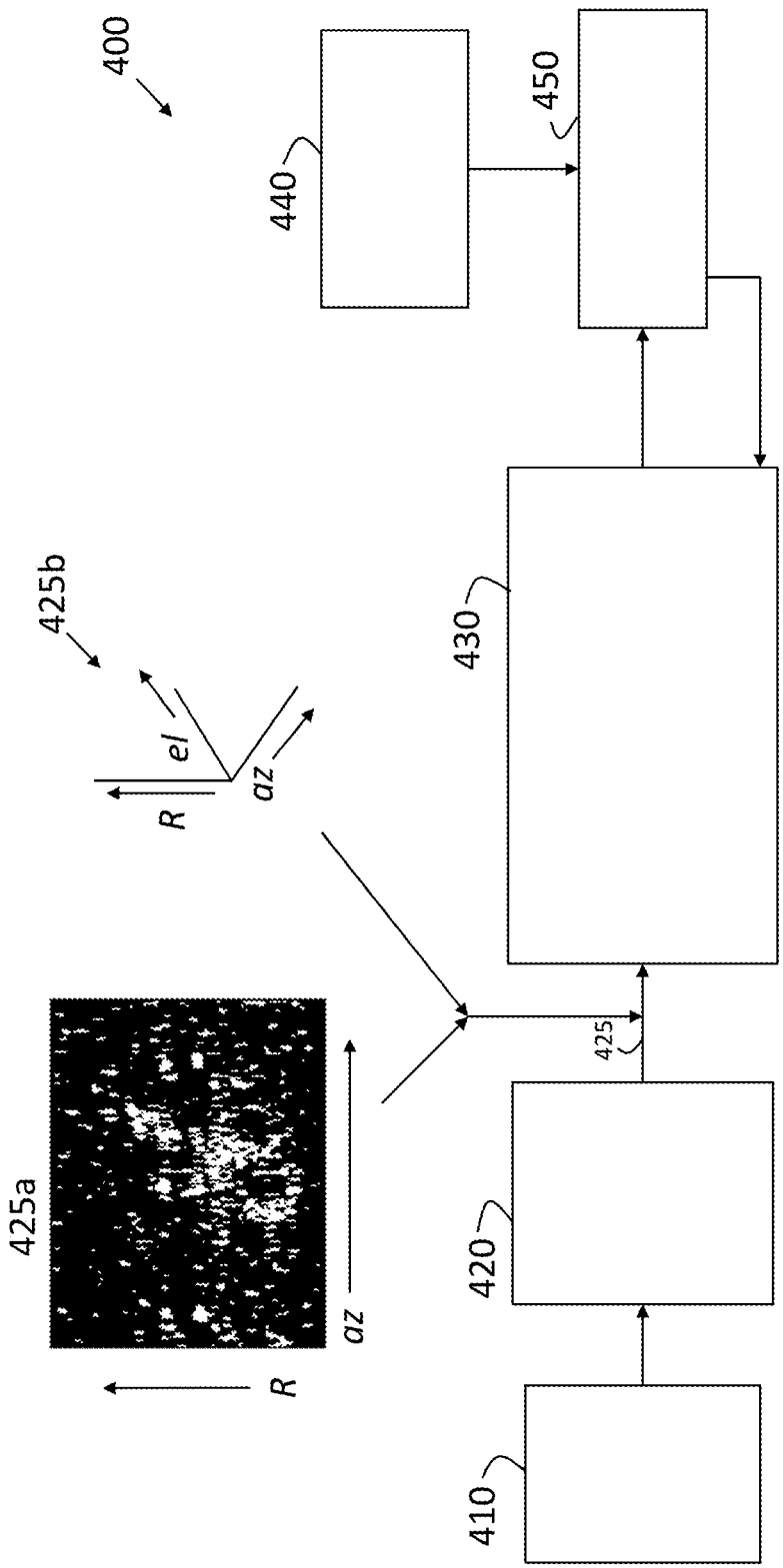
FIG. 4 is a process flow of a method of training a neural network to perform object surface estimation using a radar system according to one or more embodiments.

FIG. 4 is a process flow 400 of a method of training a neural network to perform object surface estimation using a radar system according to one or more embodiments. At block 410, obtaining reflected signals 115 refers to using either a one-dimensional antenna array 210, as shown in FIG. 2, or a two-dimensional antenna array 310, as shown in FIG. 3, to obtain the reflected signals 115 that result from reflection of transmit signals 112. As previously noted, the surface of the one or more objects 140 that reflected the transmit signals 112 is of interest.

At block 420, processing the reflected signals 115 includes performing a fast Fourier transform (FFT) and a beamforming process. The result of the processing at block 420 is a two-dimensional image 425a in the case of using a one-dimensional antenna array 210 and a three-dimensional image 425b in the case of using a two-dimensional antenna array 310 (generally referred to as image 425). The two-dimensional image 425a may indicate intensity for a set of range R and azimuth az values based on the one-dimensional antenna array 210 being a horizontal array, for example. The three-dimensional image 425b may indicate intensity for a set of range R, azimuth az, and elevation el values based on the exemplary two-dimensional antenna array 310 shown in FIG. 3, for example.

At block 430, a neural network uses the input image 425 to provide an object surface estimation according to one of two or more embodiments. Two embodiments are detailed with reference to FIGS. 6 and 7. The neural network includes layers of convolutional filters. The stride in the angle dimension may be 1 (i.e., every angle index from the input image 425 is maintained) but the stride in the range dimension may be 2, for example. In that case, every other range index from the input image 425 is maintained, thereby reducing the range dimension. The range dimension may be shrunk to one index. This is because only one range value for each angle (or pair of angles) is needed but angle resolution needs to be maintained. The output of the neural network generally indicates a range and angle (or pair of angles) at which there is a detection. The detection corresponds with an outline of the surface of an object 140 resulting in the detection. The output of the neural network is detailed with reference to FIGS. 6 and 7.

At block 440, ground truth is provided. The ground truth may be obtained using a lidar system, high resolution radar system, or another source that indicates the range and angle (or pair of angles) corresponding with the surface of an object 140. The ground truth, at block 440, is used by the neural network to perform supervised learning. The supervised learning is accomplished by calculating loss, at block 450, based on the output of the neural network (at block 430) and the ground truth (at block 440). The loss is provided as feedback, as indicated in FIG. 4, and is used to update weights in the neural network.

Figure 5:
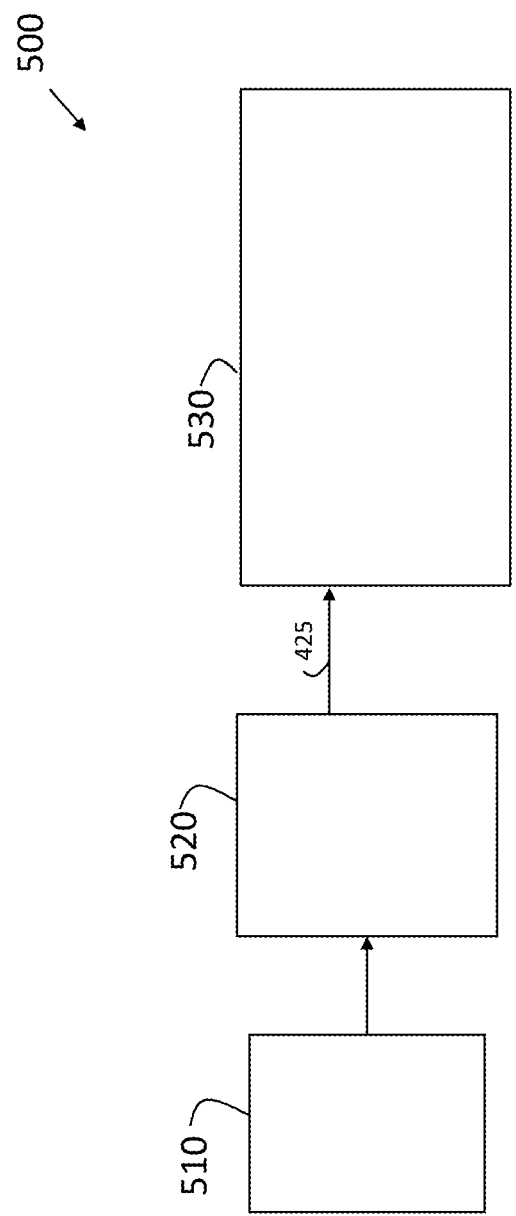
FIG. 5 is a process flow of a method of performing a neural network-based object surface estimation using a radar system according to one or more embodiments.
Figure 6:
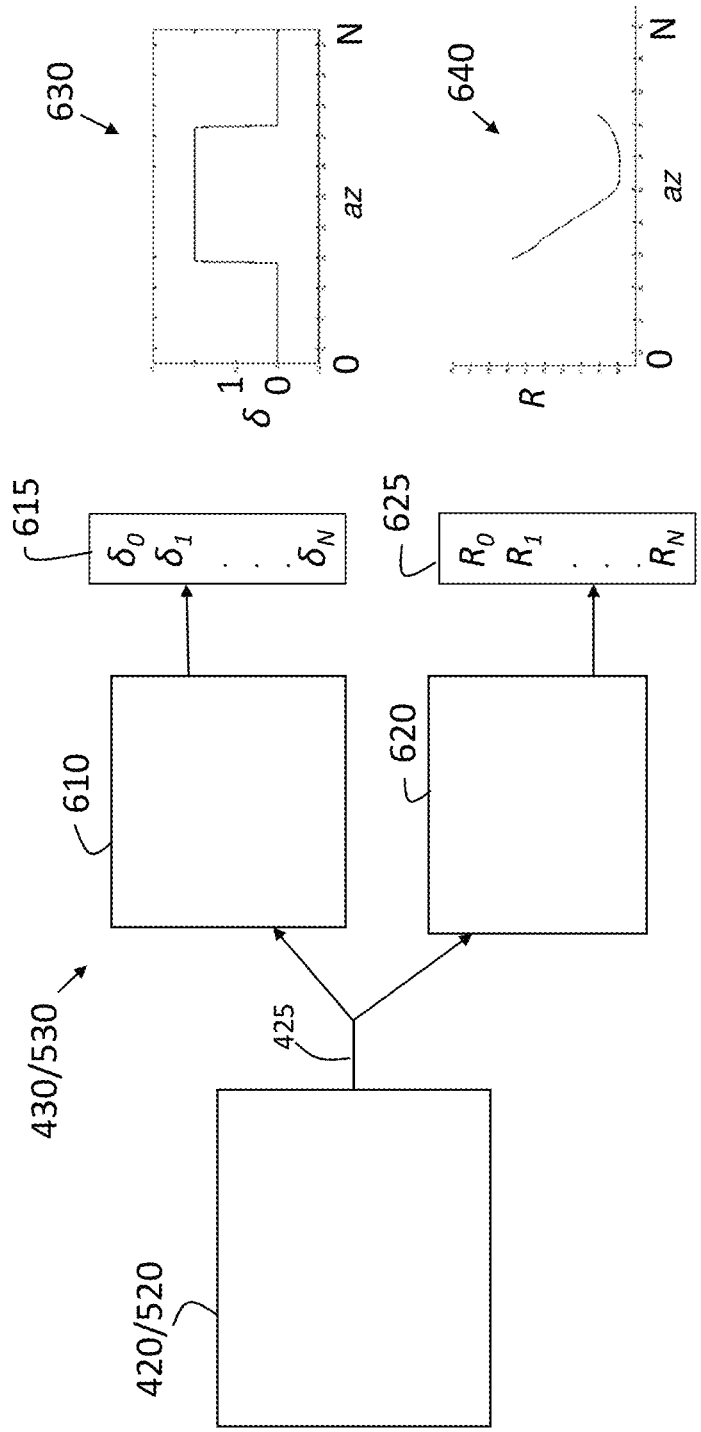
FIG. 6 illustrates an exemplary object surface estimation according to one or more embodiments.
Figure 7:
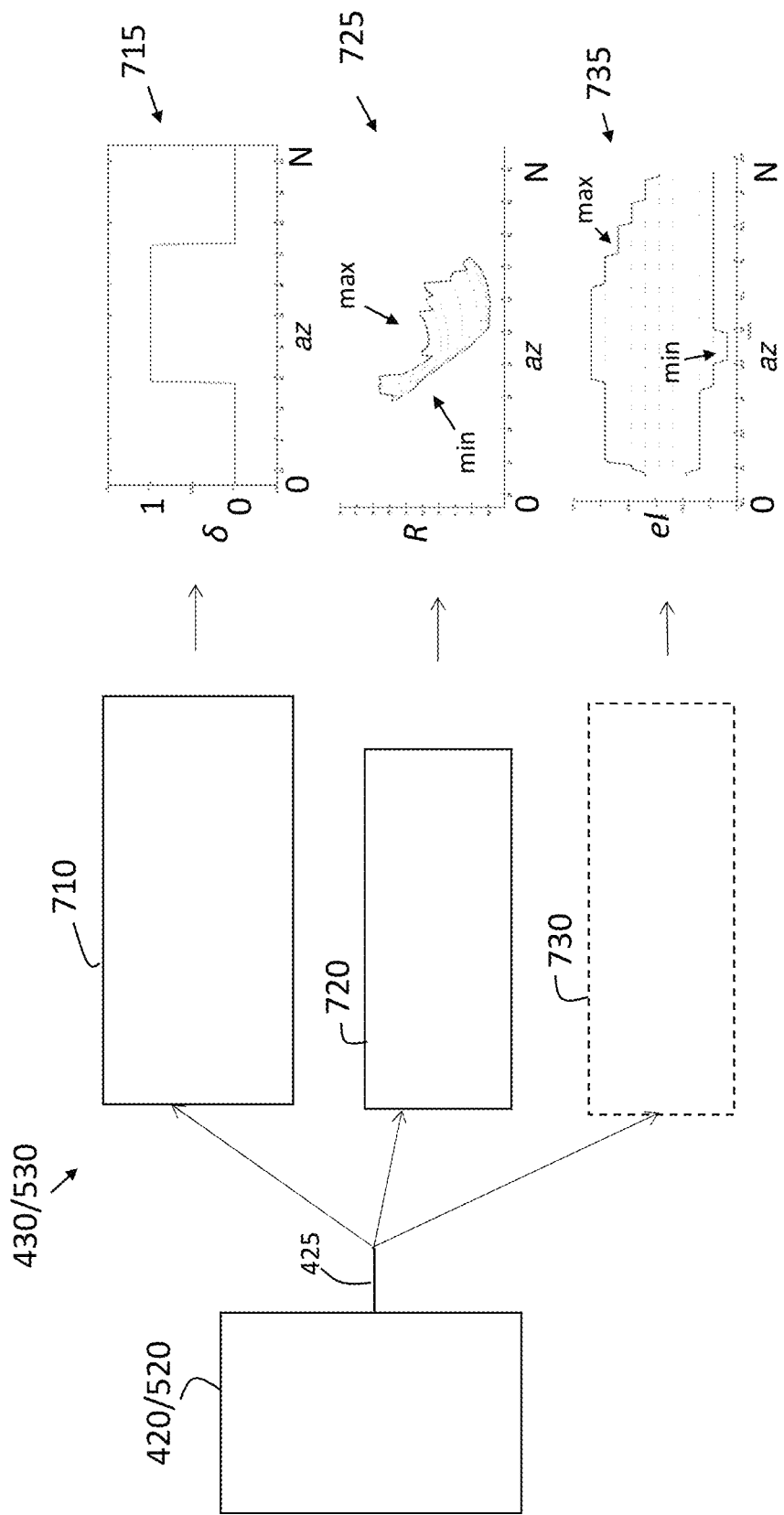
FIG. 7 illustrates an exemplary object surface estimation according to one or more embodiments.

FIG. 5 is a process flow 500 of a method of performing a neural network-based object surface estimation using a radar system according to one or more embodiments. The process flow 500 uses a neural network that has been trained using the process flow 400 shown in FIG. 4. At block 510, obtaining reflected signals 115 refers to using either a one dimensional antenna array 210 or a two-dimensional antenna array 310 to obtain the reflections resulting from transmit signals 112. Processing the reflected signals 115, at block 520, refers to obtaining an image 425 based on performing an FFT and beamforming process. The image 425 indicates an intensity associated with a set of range values and a set of angle values or a set of pairs of angle values. At block 530, the trained neural network uses the image 425 input to provide an output that indicates an outline that defines the surface of an object 140 that resulted in the reflected signals 115. FIGS. 6 and 7 detail the output according to two different embodiments.

FIG. 6 illustrates an exemplary object surface estimation according to one or more embodiments. Continuing reference is made to the preceding figures. The processes shown in FIG. 6 may be performed during the training process flow 400, shown in FIG. 4, or during the implementation process flow 500, shown in FIG. 5. The ground truth provided at block 440 (FIG. 4) also includes the classification bits δ and ranges R obtained with the neural network and discussed herein. As discussed with reference to FIGS. 4 and 5, processing of reflected signals 115 at block 420 or at block 520 results in an image 425 that is input to the neural network. The image 425 is two-dimensional when a one-dimensional antenna array 210 is used, and the image 425 is three-dimensional when a two-dimensional antenna array 310 is used. Providing the image 425 to a neural network, which is implemented at blocks 610 and 620, is done at block 430 during the training phase and at block 530 during implementation.

At block 610, determining a classification bit δ is performed for every azimuth az value, for example, when the exemplary horizontal one-dimensional antenna array 210 is used. This results in a one-dimensional array 615. The graph 630 shows the classification bit δ for 0 to N azimuth az values. Alternately, determining the classification bit δ, at block 610, is performed for every azimuth az and elevation el pair when the exemplary two-dimensional antenna array 310 is used. This results in a one-dimensional array 615 for every value of elevation el. In this case, the graph 630 of 0 to N azimuth az values would be repeated for every value of elevation el. The classification bit δ has a value of "0" when the associated intensity in the input image 425 is below a threshold value (i.e., there is no discernable reflection from this azimuth az value) or "1" when the associated intensity in the input image 425 is above a threshold value (i.e., there is a discernable reflection from the azimuth az value). In the case of the two-dimensional antenna array 310 being used, the reflection must be from the indicated azimuth az angle at the particular elevation el angle in order for the classification bit δ to be "1."

At block 620, determining a range R refers to determining the range to an object 140 that reflects the transmit signal 112 and provides a reflected signal 115. The result is the array 625. As such, range R is only of interest for azimuth az values for which the classification bit δ is "1." That is, when the classification bit δ is "0," it indicates that a reflection was not detected at the corresponding azimuth az. Thus, there is no range R value of interest at that corresponding azimuth az. Graph 640 shows range R values corresponding with azimuth az values that have an associated classification bit δ of "1." As noted for the graph 630, when a two-dimensional antenna array 310 is used, it provides both azimuth az and elevation el, as shown in FIG. 3. Thus, the graph 640 would be repeated for each elevation el value. The graph 640 indicates the surface estimation for the object 140 that provided the reflected signals 115 in the exemplary case.

According to the embodiment shown in FIG. 6, the loss calculated at block 450 (FIG. 4) is given by:

$$\sum_{i=0}^{N-1} \delta_i |\hat{R}_i - R_i|^p - \lambda \log(\hat{\delta}_i)$$ [EQ. 1]

In EQ. 1, $\hat{R}_i$, and $\hat{\delta}_i$ indicate outputs of the neural network while $R_i$ and $\delta_i$ indicate ground truth values. The weight factor λ is updated during each training iteration. The value of p may be 1 or 2 and refers to a known neural network loss parameter. A value of 1 is a norm 1 known as L1 loss, and a value of 2 is a norm 2 known as L2 loss. As noted, the embodiment discussed with reference to FIG. 6 applies to using both a one-dimensional antenna array 210 and a two-dimensional antenna array 310. As also noted, when a two-dimensional antenna array 310 that arranged as shown in FIG. 3 is used, the azimuth az index range from 0 to N shown in FIG. 6 may be repeated for every value of elevation el. Alternately, even if a two-dimensional antenna array 310 is used, only a single graph 630 may be obtained. According to the alternate embodiment, elevation estimation may be performed after the neural network stage.

FIG. 7 illustrates an exemplary object surface estimation according to one or more embodiments. Continuing reference is made to the preceding figures. The processes shown in FIG. 7 may be performed during the training process flow 400, shown in FIG. 4, or during the implementation process flow 500, shown in FIG. 5. The ground truth provided at block 440 (FIG. 4) also includes the classification δ, the range R, and potentially the elevation el obtained with the neural network and discussed herein. As discussed with reference to FIGS. 4 and 5, processing of reflected signals 115 at block 420 or at block 520 results in an image 425 that is input to the neural network. The image 425 is two-dimensional when a one-dimensional antenna array 210 is used, and the image 425 is three-dimensional when a two-dimensional antenna array 310 is used. Providing the image 425 to a neural network, which is implemented at blocks 710, 720, and 730, is done at block 430 during the training phase and at block 530 during implementation.

At block 710, determining a classification bit δ is for every azimuth az value, for example, when the exemplary horizontal one-dimensional antenna array 210 is used. The graph 715 shows the classification bit δ for 0 to N azimuth az values. Like the classification bit δ discussed with reference to FIG. 6, the classification bit δ shown in graph 715 has a value of "0" at azimuth az indexes that are not associated with intensity values of the image 425 that exceed a threshold and a value of "1" at azimuth az indexes that are associated with intensity values of the image 425 that exceed the threshold. Unlike the embodiment shown in FIG. 6, when a two-dimensional antenna array 310 is used, rather than generating a graph 715 for every elevation el value, the embodiment shown in FIG. 7 involves calculating minimum and maximum elevation el values, at block 730. Graph 735 shows the resulting minimum (min) and maximum (max) values for elevation el for each azimuth az index between 0 and N.

At block 720, determining a range R refers to determining the range to an object 140 that reflects the transmit signal 112 and provides a reflected signal 115. As such, range R is only of interest for azimuth az values for which the classification bit δ is "1." That is, when the classification bit δ is "0," it indicates that a reflection was not detected at the corresponding azimuth az. Thus, there is no range R value of interest at that corresponding azimuth az. Graph 725 shows range R values corresponding with azimuth az values that have an associated classification bit δ of "1." The minimum (min) and maximum (max) range R values correspond with different elevation el indexes associated with a given azimuth az index. As noted with reference to FIG. 6, even when a two-dimensional antenna array 310 is used, the process at block 730 may not be performed and, instead, elevation may be estimated after the neural network processing. By using the min and max elevation el rather than generating a graph 630 for every elevation el index, the embodiment shown in FIG. 7 facilitates generating less data, especially when the azimuth az angle is primarily of interest.

According to the embodiment of FIG. 7, the loss calculated at block 450 (FIG. 4) is given by:

$$\Sigma_{i=0}^{N-1} \delta_i |\hat{R}_i^{min} - R_i^{min}|^p + \delta_i |\hat{R}_i^{max} - R_i^{max}|^p + \delta_i |\hat{\phi}_i^{min} - \phi_i^{min}|^p + \delta_i |\hat{\phi}_i^{max} - \phi_i^{max}|^p - \lambda \log(\hat{\delta}_i) \quad [\text{EQ. 2}]$$

In EQ. 2, $\hat{R}_i^{min}$ and $\hat{R}_i^{max}$ are, respectively, the minimum and maximum range R values output by the neural network for a given azimuth angle index i, and $R_i^{min}$ and $R_i^{max}$ are the minimum and maximum ground truth range values. The classification bit δ according to the neural network and ground truth, respectively, are $\hat{\delta}_i$ and $\delta_i$. And, $\hat{\phi}_i^{min}$ and $\hat{\phi}_i^{max}$ are, respectively, the minimum and maximum elevation angle φ values output by the neural network for a given azimuth angle index i, and $\phi_i^{min}$ and $\phi_i^{max}$ are the minimum and maximum ground truth elevation angle values.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method to perform object surface estimation using a radar system, the method comprising:
    receiving reflected signals resulting from reflection of transmit signals by an object;
    processing, using a processor, the reflected signals to obtain an image, the image indicating an intensity associated with at least one set of angle values and a set of range values;
    processing, using the processor, the image to provide the object surface estimation, the object surface estimation indicating a subset of the at least one set of angle values and associated ranges within the set of range values, wherein the receiving the reflected signals includes using a two-dimensional array of antenna elements, the image is a three-dimensional image indicating the intensity associated with a first set of angle values, a second set of angle values, and the set of range values providing the object surface estimation includes indicating azimuth angle values from which the reflected signals originate, associated minimum and maximum elevation angles, and associated minimum and maximum ranges.

2. The method according to claim 1, further comprising training a neural network to implement the processing of the image.

3. The method according to claim 2, wherein the training the neural network includes implementing a supervised learning process by calculating a loss based on an output of the neural network and on ground truth.

4. The method according to claim 3, wherein the training the neural network includes providing the loss as feedback to the neural network.

5. The method according to claim 1, further comprising locating the radar system in a vehicle and controlling an operation of the vehicle based on the object surface estimation.

6. A system to perform object surface estimation using a radar system, the system comprising:
    a plurality of antenna elements configured to receive reflected signals resulting from reflection of transmit signals by an object; and
    a processor configured to process the reflected signals to obtain an image, the image indicating an intensity associated with at least one set of angle values and a set of range values, and to process the image to provide the object surface estimation, the object surface estimation indicating a subset of the at least one set of angle values and associated ranges within the set of range values, wherein
    the plurality of antenna elements is arranged as a one-dimensional array of antenna elements, the image is a two-dimensional image indicating the intensity associated with the set of angle values and the set of range values, and the object surface estimation includes an indication of azimuth angle values from which the reflected signals originate and associated minimum and maximum ranges, or
    the plurality of antenna elements is arranged as a two-dimensional array of antenna elements, the image is a three-dimensional image indicating the intensity associated with a first set of angle values, a second set of angle values, and the set of range values, and the object surface estimation includes an indication of azimuth angle values from which the reflected signals originate, associated minimum and maximum elevation angles, and associated minimum and maximum ranges.

7. The system according to claim 6, wherein the processor implements a neural network to process the image.

8. The system according to claim 7, wherein the neural network is trained by a supervised learning process that includes calculating a loss based on an output of the neural network and on ground truth.

9. The system according to claim 8, wherein the loss is provided as feedback to the neural network in the training.

10. The system according to claim 6, wherein the radar system is in or on a vehicle and an operation of the vehicle is controlled based on the object surface estimation.

11. A method to perform object surface estimation using a radar system, the method comprising:
    receiving reflected signals resulting from reflection of transmit signals by an object;
    processing, using a processor, the reflected signals to obtain an image, the image indicating an intensity associated with at least one set of angle values and a set of range values;
    processing, using the processor, the image to provide the object surface estimation, the object surface estimation indicating a subset of the at least one set of angle values and associated ranges within the set of range values, wherein the receiving the reflected signals includes using a horizontal one-dimensional array of antenna elements, the image is a two-dimensional image indicating the intensity associated with the set of angle values and the set of range values, and providing the object surface estimation includes indicating azimuth angle values from which the reflected signals originate and associated minimum and maximum ranges.

* * * * *